United States Patent
Gottlieb (10) Patent No.: US 8,275,346 B2
(45) Date of Patent: Sep. 25, 2012

(54) WIRELESS, CENTRALIZED EMERGENCY SERVICES SYSTEM

(75) Inventor: Mark Gottlieb, Fairfax Station, VA (US)

(73) Assignee: Logicmark, LLC, Buffalo Grove, IL (US)

( * ) Notice: Subject to any disclaimer, the term of this patent is extended or adjusted under 35 U.S.C. 154(b) by 1228 days.

(21) Appl. No.: 12/007,740

(22) Filed: Jan. 15, 2008

(65) Prior Publication Data

US 2009/0181638 A1 Jul. 16, 2009

(51) Int. Cl.
*H04M 11/04* (2006.01)

(52) U.S. Cl. ............... 455/404.1; 455/404.2; 455/414.1; 379/37; 379/38

(58) Field of Classification Search ............... 455/404.1, 455/404.2, 414.1; 379/37, 38
See application file for complete search history.

(56) References Cited

U.S. PATENT DOCUMENTS

| | | | |
|---|---|---|---|
| 2006/0128356 A1* | 6/2006 | Yamazaki et al. | 455/404.1 |
| 2007/0179806 A1* | 8/2007 | Knowlton et al. | 705/2 |
| 2008/0248778 A1* | 10/2008 | Boss et al. | 455/404.1 |
| 2009/0096602 A1* | 4/2009 | Reyes et al. | 340/506 |

* cited by examiner

*Primary Examiner* — Justin Lee
(74) *Attorney, Agent, or Firm* — Patzik, Frank & Samotny Ltd.

(57) ABSTRACT

Plural voice pendants 100 communicate with a remote monitoring station using a wireless communications protocol and without requiring a connection to a circuit switched telephone network. Such a configuration may be used in any group environment, such as a retirement home or an assisted living facility. The voice pendants can be carried or worn by the residents/patients/members of the home or the facility to assist in calling for help in an emergency situation, e.g., if someone has fallen and cannot get up. By activating an actuator (e.g., a button or switch) on the pendant, the person wearing the pendant is put into voice communication with the monitoring station without the need to dial any phone numbers or hit a "send" style button which indicates the end of a dialed number sequence.

14 Claims, 8 Drawing Sheets

Voice Pendant 100

WIRELESS, CENTRALIZED EMERGENCY SERVICES SYSTEM

CROSS-REFERENCE TO RELATED APPLICATIONS

The present application is related to U.S. patent application Ser. No. 11/517,320, which was filed Sep. 8, 2006 and which names Mark Gottlieb as the sole inventor. The contents of that application are incorporated herein by reference.

FIELD OF INVENTION

The present application relates to emergency services calling system, and in one embodiment, to an emergency services calling system that contacts a centralized monitoring agent using a data-based wireless computer communications protocol.

DISCUSSION OF THE BACKGROUND

Known systems have been designed and sold that allow a person who may need emergency services to contact a remote facility by activating a wearable pendant. Two main versions of such systems currently exist. In the first known system, the pendant remotely activates a base station that is equipped with a speaker phone. In a system where a customer is paying for a remote monitoring service, the base station automatically dials the phone number of the remote monitoring service using the public switched telephone network (PSTN) which is a circuit-switched network. The customer's voice received by the speakerphone can inform the remote monitoring service of what the problem is. However, if the customer is not close enough to the speakerphone for his/her voice to be heard, then the remote monitoring service cannot be informed of the nature of the problem.

Figure 1:
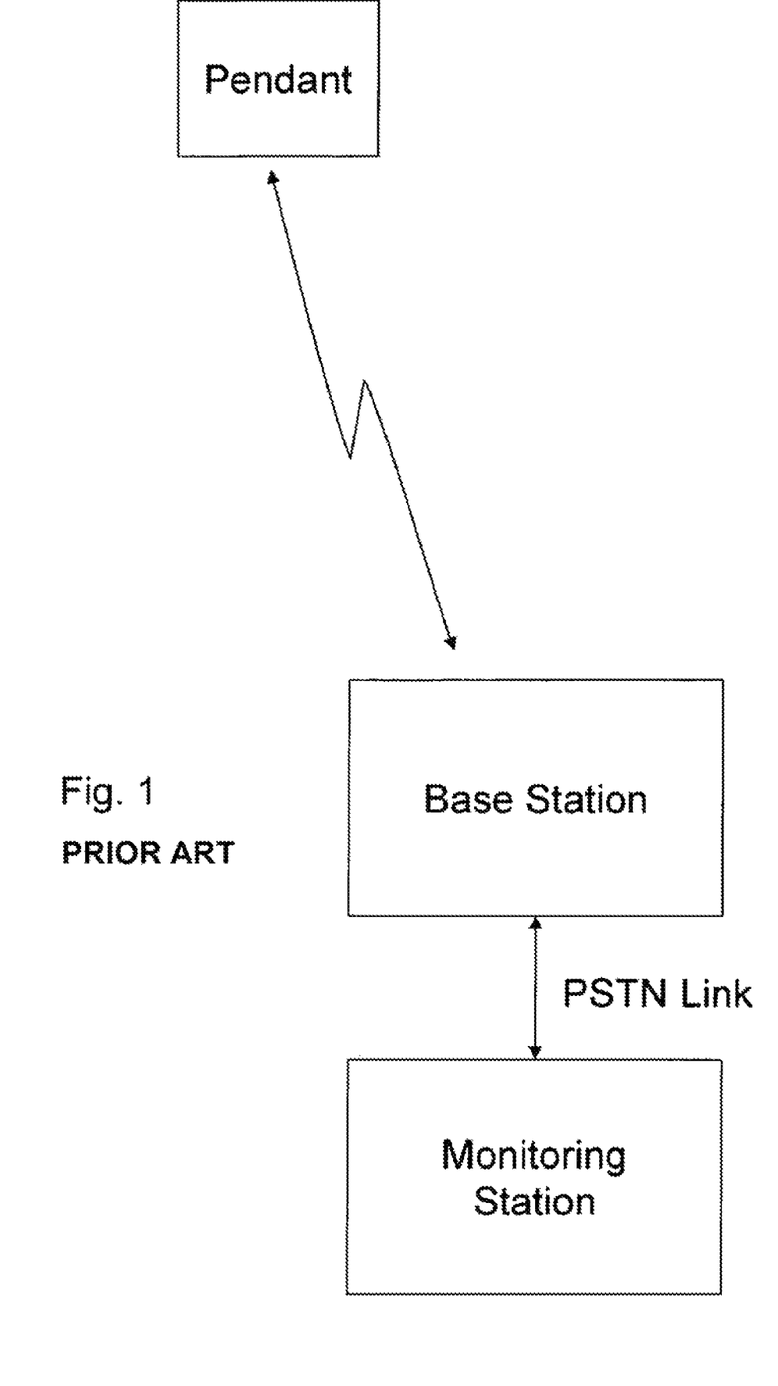
FIG. 1 is block diagram of a voice-based pendant communicating with a single base station that in turn contacts a remote monitoring station using the PSTN.

A second type of emergency system, as shown in FIG. 1, includes a base station, like the first system, but the pendants include a speakerphone that can carry voice signals to the base station where they are then transmitted over a PSTN line to the remote monitoring station.

Both systems further include the ability for the pendant to identify itself to the base station and for the base station to transmit that information to the monitoring service. In this way, the remote monitoring service can know who is requesting emergency help. Such systems may also be able to send emergency requests from sensors in the home (e.g., smoke detectors) such that the remote monitoring system can be alerted to other possible emergency situations.

BRIEF DESCRIPTION OF THE DRAWINGS

The following description, given with respect to the attached drawings, may be better understood with reference to the non-limiting examples of the drawings, wherein.

DISCUSSION OF THE PREFERRED EMBODIMENTS

Figure 2:
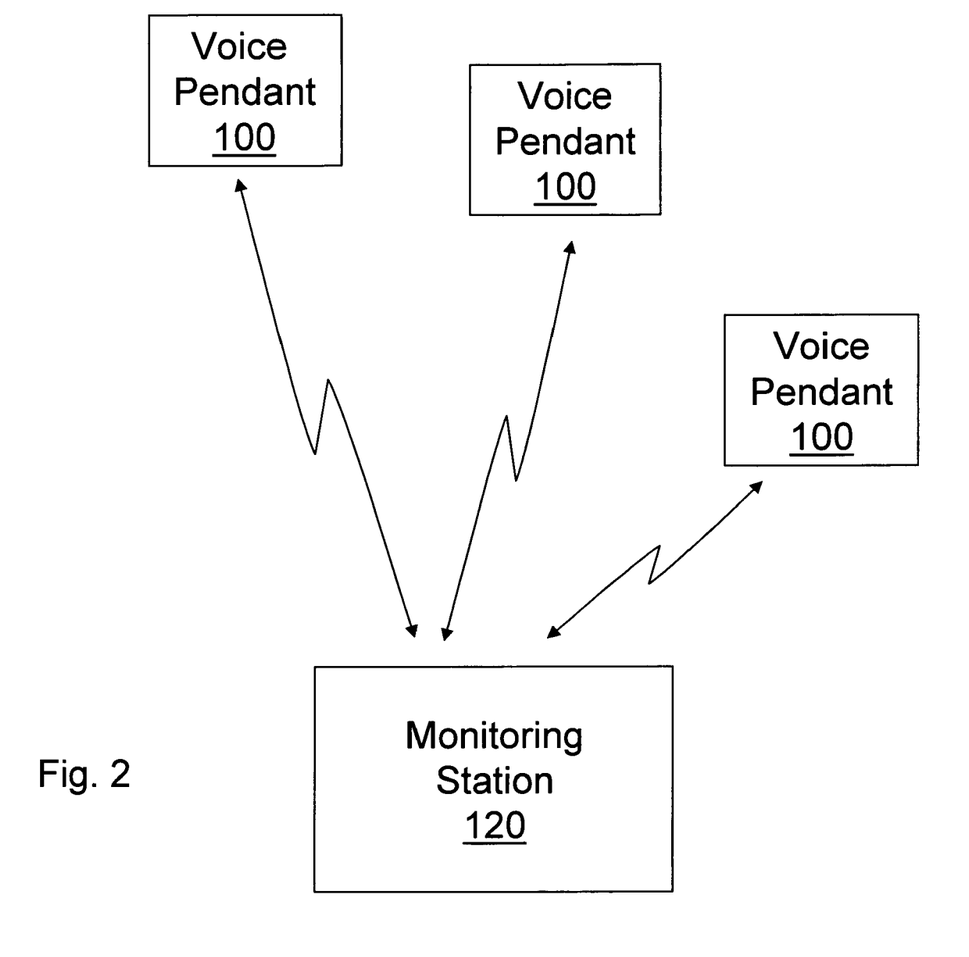
FIG. 2 is a block diagram of plural voice pendants wirelessly connecting to a monitoring station without the need for a PSTN connection.

Turning to FIG. 2, plural voice pendants 100 communicate with a remote monitoring station 120 using a wireless communications protocol. Such a configuration may be used in any group environment, such as a retirement home or an assisted living facility and does not require the use of a circuit switched telephone network to communicate the voice signals from the voice pendants 100 to the monitoring station 120. The voice pendants 100 can be carried or worn by the residents/patients/members of the home or the facility to assist in calling for help in an emergency situation, e.g., if someone has fallen and cannot get up. By activating an actuator (e.g., a button or switch) on the pendant 100 (e.g., the single button (not shown) on the pendant), the person wearing the pendant is put into voice communication with the monitoring station 120 without the need to dial any phone numbers or hit a "send" style button which indicates the end of a dialed number sequence. (To avoid accidental activation of the actuator, the actuator may need to be held down for a particular period of time or may need to be actuated in a particular pattern (e.g., (1) pressed and held, released, and then pressed and held for a particular period of time or (2) pressed at least a selected number of times within a specified period.)

As described herein, the wireless communications protocol is preferably a computer data network protocol, such as any of the 802.11 family of standards, a Wi-Max standard, and/or a wireless, mesh-based protocol (e.g., using the ZigBee standard). By utilizing such a communications standard, general purpose, off-the-shelf components can be used to route the voice communications from the pendant 100 to the monitoring station 120. In the illustrated embodiment of FIG. 2, the monitoring station 120 includes an integrated wireless transceiver (not shown) for receiving and transmitting signals representing the information packets between the pendant 100 and the monitoring station 120. The communications between the pendant 100 and the monitoring station 120 therefore become a voice over internet protocol (VoIP) style call with the remote monitoring station 120 being automatically dialed by the activation of the actuator on the pendant 100. Using an IP-based, packet-switched protocol, the voice connection may be made using any combination of (1) a reliable (retransmission-based) protocol or an unreliable protocol and (2) a connection-based or connection-less protocol. Exemplary protocols include, but are not limited to, TCP/IP, UDP/IP, RDP/IP (reliable datagram protocol). Additionally, for the transmission of data (e.g., location or hardware data), a reliable protocol may be used while for the transmission of packetized voice (for which retransmission is not helpful) an unreliable protocol (e.g., UDP) may be used.

Depending on the embodiment, the pendant 100/105 is able to communicate directly or indirectly with the monitoring station 120. The remote monitoring station 120 is preferably the front desk or the emergency desk of the home or facility. In such embodiments, the signals transmitted by a pendant 100/105 may be modified (e.g., to remove framing or packet information not needed by the monitoring station 120) before passing the (modified) signals on to the monitoring station 120.

Figure 3A:
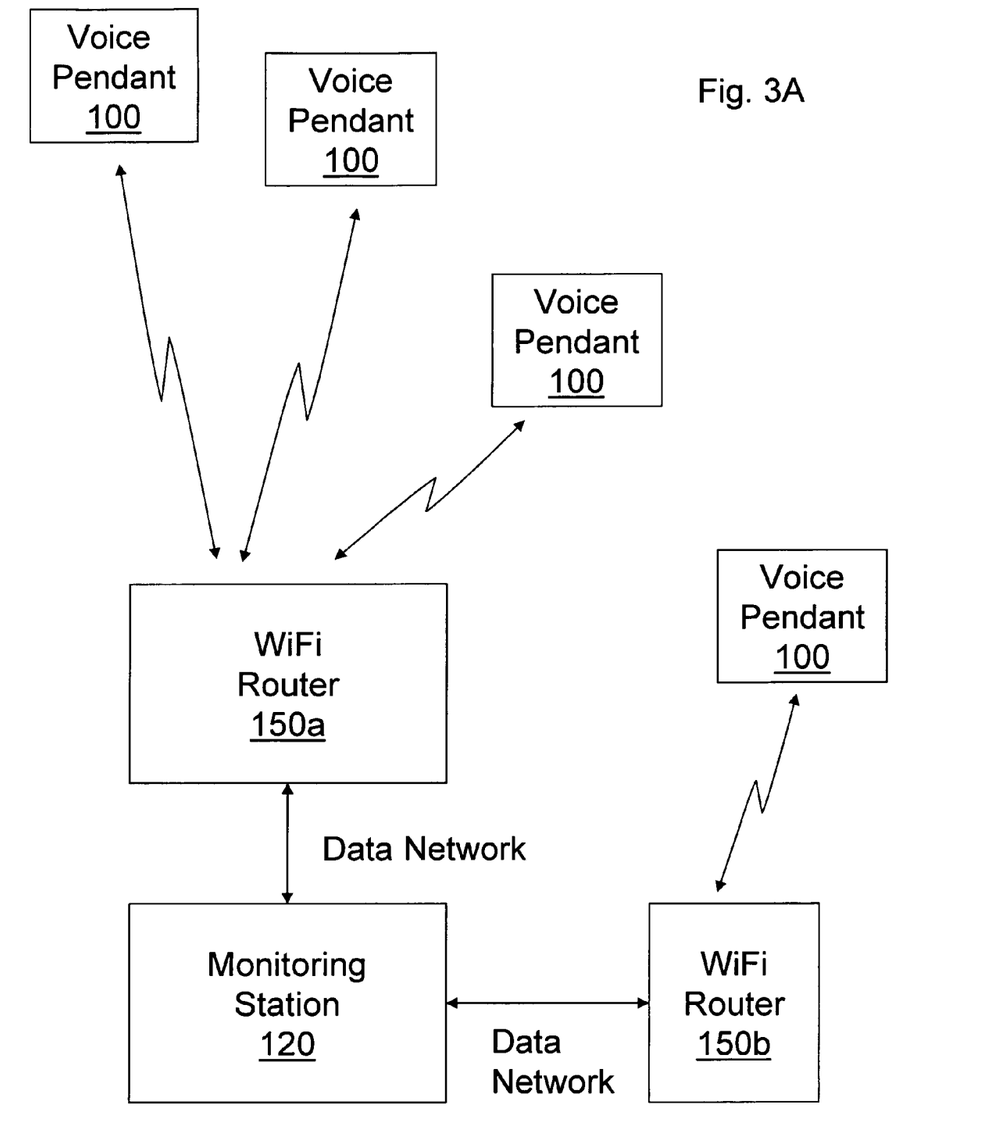
FIG. 3A is a block diagram of plural voice pendants wirelessly connecting to a monitoring station through a wireless router and over a data network but without the need for a PSTN connection.

In FIG. 3A, the pendant 100 communicates with a wireless router 150a or 150b which may be connected to the monitoring station 150 (e.g., by a data network such as an Ethernet network or even the Internet). In an embodiment where a pendant 100 may move from an area covered by a first router (e.g., 150a) to an area covered by a second router (e.g., 150b), the pendant 100 preferably includes logic or hardware to automatically connect to a new router and disconnect from an old router as signal strengths change (e.g., automatically selecting the strongest signal or the router with the fewest used channels).

When the actuator (e.g., switch) on a pendant 100 is activated, in addition to establishing voice communications, preferably an identifier (e.g., stored in a memory of the pendant 100) is also transmitted from the pendant to the remote monitoring station to enable the monitoring station to identify which of the possibly many pendants was activated. In one embodiment, the general location of the pendant 100 can be determined and communicated to the remote monitoring station 120. In one such embodiment, the pendant 100 remembers which router 150 it is connected to and transmits that information to the monitoring station before or during the emergency communications. In an alternate embodiment, the monitoring station queries the network to determine the route that packets take to reach the pendant, thereby determining which router 150 the pendant is connected to. In yet another embodiment, plural routers may be queried as to whether they can currently receive a signal from the pendant and, if available, what the signal strength is of the received signal. Similarly, the pendant may send messages to each of the routers that have signals that can be received by the pendant to help better locate the pendant. Alternatively, the pendant can send to the monitoring station a list of all the routers from which it received messages within a fixed period of time. Any of these techniques aid in triangulating where the pendant is.

Figure 4:
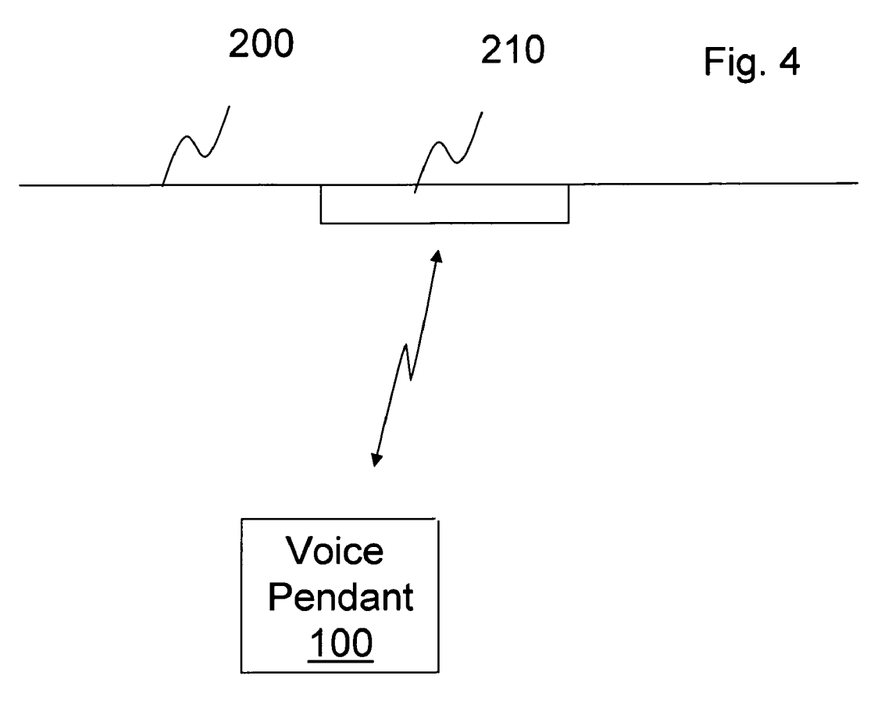
FIG. 4 is a block diagram of a voice pendant communicating with an IR transceiver to provide location information about the voice pendant.

In yet another embodiment, the pendant may include some other positioning information system (e.g., a global positioning system or a line of sight system such as an IR transceiver 210 such as could be mounted on a ceiling 200 as shown in FIG. 4). The location information from such a positioning system can be transmitted to the remote monitoring system, either through the pendant or from the positioning system itself.

Figure 3B:
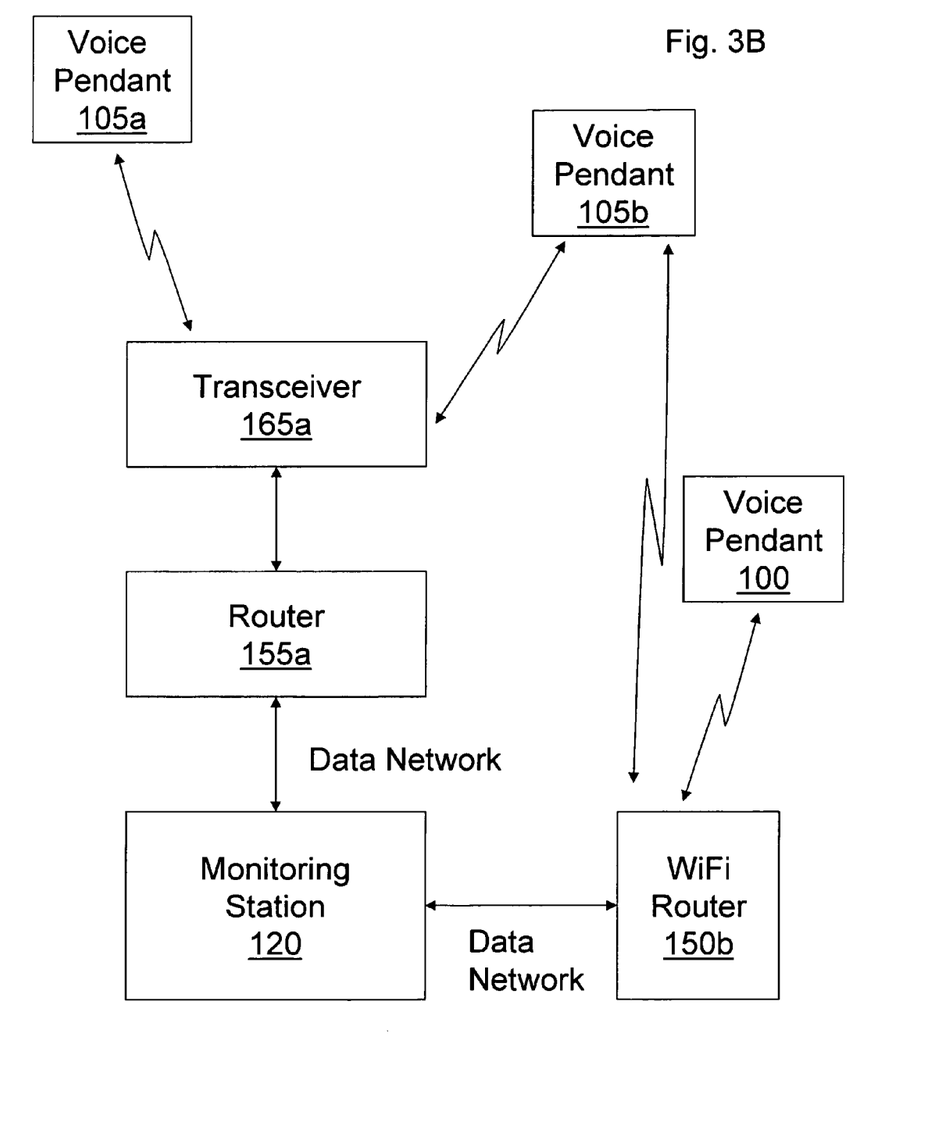
FIG. 3B is a block diagram of plural voice pendants wirelessly connecting to a monitoring station through (1) an analog transceiver connected to a router and (2) a wireless router without the need for a PSTN connection.

In addition to communicating via the wireless computer data network, a pendant may also be able to communicate with a transceiver using a wireless non-computer data network (e.g., using a cordless telephone protocol such as a 900 MHz protocol). As shown in FIG. 3B, an alternate voice pendant 105 communicates with the remote monitoring station via a transceiver 165a and/or via a Wi-Fi router 150b (as described above). In such a configuration, the transceiver 165a acts as a forwarding device or a translation device (e.g., converting, for example, (1) from the 900 MHz cordless phone protocol to a wired or wireless computer data protocol or (2) from an 802.11 family of protocols to a Wi-Max protocol). Using such a transceiver, any available protocol can be converted into any other protocol such that protocols having one advantage (e.g., additional range) can be converted into protocols having another advantage (e.g., dynamic routing). As shown in FIG. 3B, at least voice pendant 105b is capable of communicating in at least two protocols, either alternately or simultaneously. In such a configuration, the pendant 105b may be programmed to give preference to one of the two protocols or may even be switched from one to the other through external control (e.g., in response to a command from the monitoring station).

In the embodiment of FIG. 3B, communications from voice pendant 105a are received by the transceiver 165a, converted from a first protocol to a second protocol and forwarded on to the router 155a. The router 155a may be either a wireless router (like 150b) or may be a wired router such as an Ethernet router. Preferably, the router 155a then forwards signals representing the communications from voice pendant 105a to the monitoring station 120 (after having added any necessary information such as headers or routing information).

In one embodiment of the present invention, hardware checks can be performed periodically to determine the health of the pendant. For example, the battery level of the pendant can be checked periodically (e.g., every day, every half hour, or every 10 minutes) at a "check in" time and the results sent to the remote monitoring station. As used herein, periodically may also include at a regular interval plus or minus some random amount to help avoid repeated collisions by multiple pendants trying to transmit on the same schedule. In this way, the management of the facility or home would know which batteries need replacing and could do so as appropriate. Also, by only turning on the wireless interface periodically to report the results of the tests, battery life can be extended as compared to a pendant that leaves its wireless interface active at all time.

In response to receiving the hardware test results (or at any other time that the pendant is actively communicating), the remote monitoring system may send an acknowledgement or a request for some process to be performed. For example, the remote monitoring system may request that the pendant change some internal parameter (e.g., its "check in" time), identify its current location, play a prerecorded message, or begin a voice conversation with the remote monitoring station. As an additional internal parameter, the remote monitoring system may also set a time at which the pendant should play a particular message. For example, the pendant may receive a message that causes the pendant to play a reminder at a particular time that it is lunch time or that medicine must be taken. In this way, even if the pendant has gone beyond the transmission bounds of the wireless system, the pendant can still remind the patient of important events. Such messages may be either prestored in a memory (e.g., a non-volatile memory) of the pendant (e.g., when the pendant is configured to work with the remote monitoring station) or may be dynamically (e.g., wirelessly) transmitted to the pendant and stored in a memory (e.g., a volatile or a non-volatile memory) of the pendant (e.g., when the time for playing the message is transmitted to the pendant or at a time (e.g., at night) when the network is not busy). By using identifiers identifying prestoring messages, the remote monitoring station can quickly identify to one, a number or all of the pendants to play the same message without requiring significant amounts of bandwidth. In one embodiment, pendants may respond to a broadcast message by playing a message that is to be heard by all members (e.g., in case of an emergency).

The same type of alarm system can be used to identify to a patient that he or she has gone beyond the bounds of the wireless transmission system or out of an area that he or she is supposed to be in. For example, if a timer reset message is sent by the remote monitoring station to each pendant every 5 minutes, then if the pendant does not receive a reset message after 6 minutes (because it is beyond the bounds of the wireless system), then that indicates that the pendant is no longer in wireless range. A message may automatically be played by the pendant at the expiration of the timer asking the patient to return to within range or to stay where he/she is if he/she is lost.

The location of the pendant 100 can also be tracked periodically (e.g., every 15 minutes or at the same time that the hardware tests are performed) such that a database of pendant locations can be maintained in real-time or in semi-realtime. Location information for all pendants may be important in case of an area wide emergency (e.g., a flood or a hurricane) or when locking a facility for the night so that all residents can quickly be accounted for. By sending the location information at the same time as the results of the hardware check, battery drain can be reduced. Alternatively, in pendants 100 that do not automatically send their location information frequently, the pendants 100 may instead respond to location queries in case a particular resident needs to be found (e.g., to administer medicine or change a battery).

The time between reporting locations may be varied in response to the movements of the pendant. For example, when a pendant is moving more frequently, the pendant may be requested to send more frequent location messages. Also, the reporting may be varied based on time of day such that more location updates are transmitted during the day than at night. In any of the above embodiments, the remote monitoring station may keep a log of the last "x" locations that were reported for each pendant, optionally with an arrival time and/or a departure time for each location, where "x" is some integer threshold.

Figure 5:
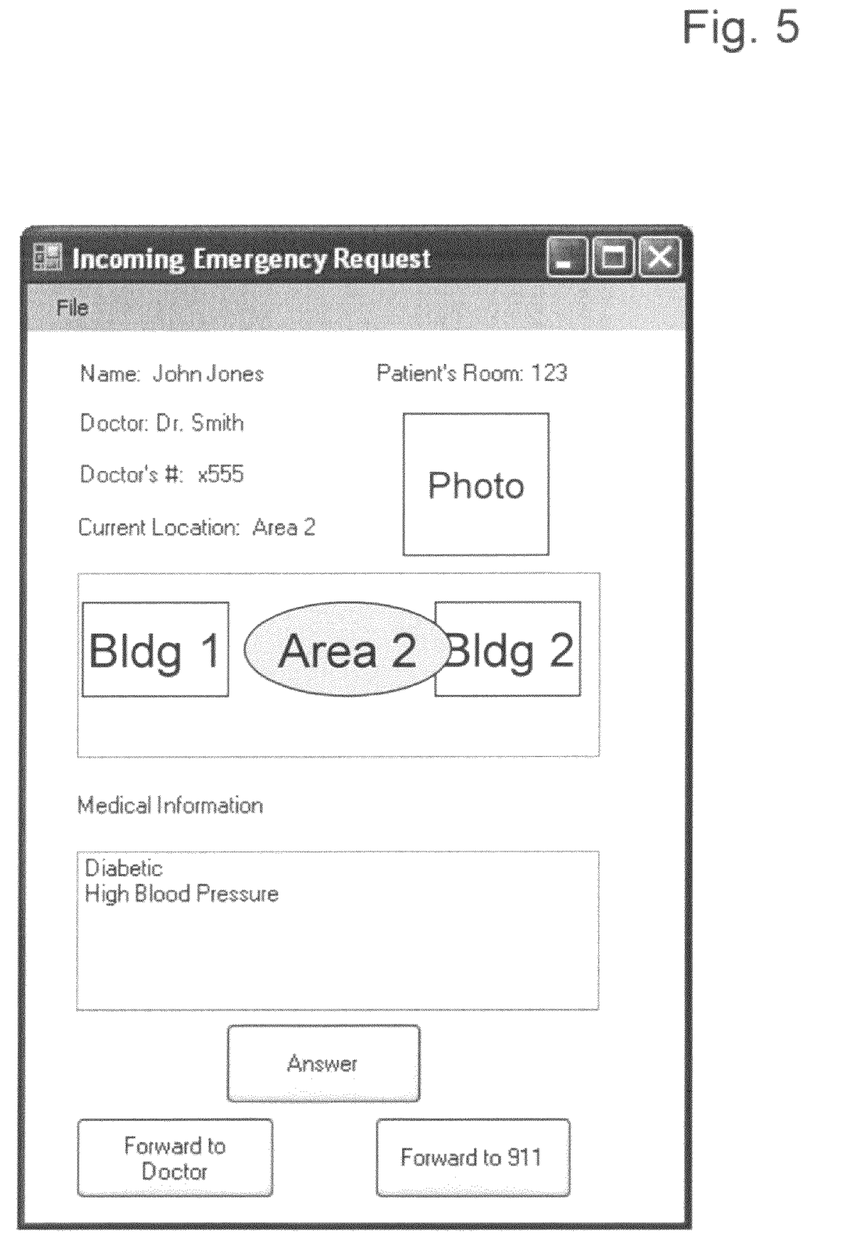
FIG. 5 is a screenshot of an exemplary computer interface for handling incoming requests at a monitoring station.

On the remote monitoring station side, at least one computer program responds to the actuator (e.g., switch) of a pendant being activated such that voice communications between the pendant and the computer of the monitoring system is activated. For example, an exemplary interface is shown in FIG. 5 indicating that there is an incoming emergency request from John Jones who occupies room 123 and whose doctor is Dr. Smith at extension 555. This information can be read from a database (e.g., stored as a file) by querying the database based on the pendant ID that is received along with the emergency request. The retrieved information can then be displayed to the caretaker to help the caretaker decide how best to respond to the request.

In addition, if available, the computer program visually identifies to the caretaker at the remote monitoring facility the last known location of the activated pendant as well as any updates to the location of the pendant. Such information may be displayed textually (e.g., by identifying a known area such as "Area 2") and/or graphically (e.g., by displaying a map of the general location showing area 2 being just outside of "Building 2"). In one embodiment, if the pendant has not provided the remote monitoring station with the pendant's location in the very recent past (e.g., in the last 30 seconds or with the emergency request), then the remote monitoring system requests that pendant and/or other sensors in the area, provide the most up-to-date location information possible.

In addition to the voice communications being established with the remote monitoring station, the voice communications may also be established with another on-site or off-site location. For example, if the caretaker at the remote monitoring station does not answer the request for establishing voice communications within a specified period of time, the request may be forwarded to another location (e.g., another desk, floor or building or a 911 emergency services center). This forwarding may be necessary if a caretaker has already gone to help another resident and is not at a main desk associated with the pendant. This forwarding may also require conversion from the VoIP call format to another format (e.g., a PSTN format or a cellular format) and may require access to a telephone line of that other format. Alternatively, even the connection to an outside number may be made using VoIP style calling services.

As shown in FIG. 5, the caretaker may also manually send the call request to the patient's doctor (e.g., at the number read from the database) or to 911 emergency services. As would be appreciated by those of skill in the art, such an interface may include additional transfer locations (e.g., shift supervisor, security, fire department).

Requests for communications may also be automatically re-routed under software control. For example, emergency requests during business hours may be routed to a caretaker on a floor associated with the router to which the pendant is connected. However, during evening or nighttime hours, when there are fewer personnel on duty, the emergency request may be forwarded to a caretaker on a different floor if there is no one on duty on the floor associated with the router to which the pendant is connected. Similarly, a caretaker may reroute all calls to another location when the caretaker is on break or is already helping another resident such that the delay time in answering the request for communication is reduced. In such a situation, it is also possible to use pre-recorded messages that are tied into the public address system such that medical personnel in the general area of the emergency may be audibly alerted to the condition and/or its location. Likewise, a page may be sent to the pager or cell phone of one or more medical team members.

In addition to providing patient name and location information on the interface of the remote monitoring station, additional information, such as medical information, may be displayed also after reading the information from the database. As shown in FIG. 5, the fact that John Jones is a diabetic and not responding to questions posed by the caretaker may indicate that a diabetic coma has set in and the caretaker should bring the appropriate medicine. Similarly, early responses to strokes are very important so information about whether a patient is a stroke candidate would be additional important information to display.

Figure 6:
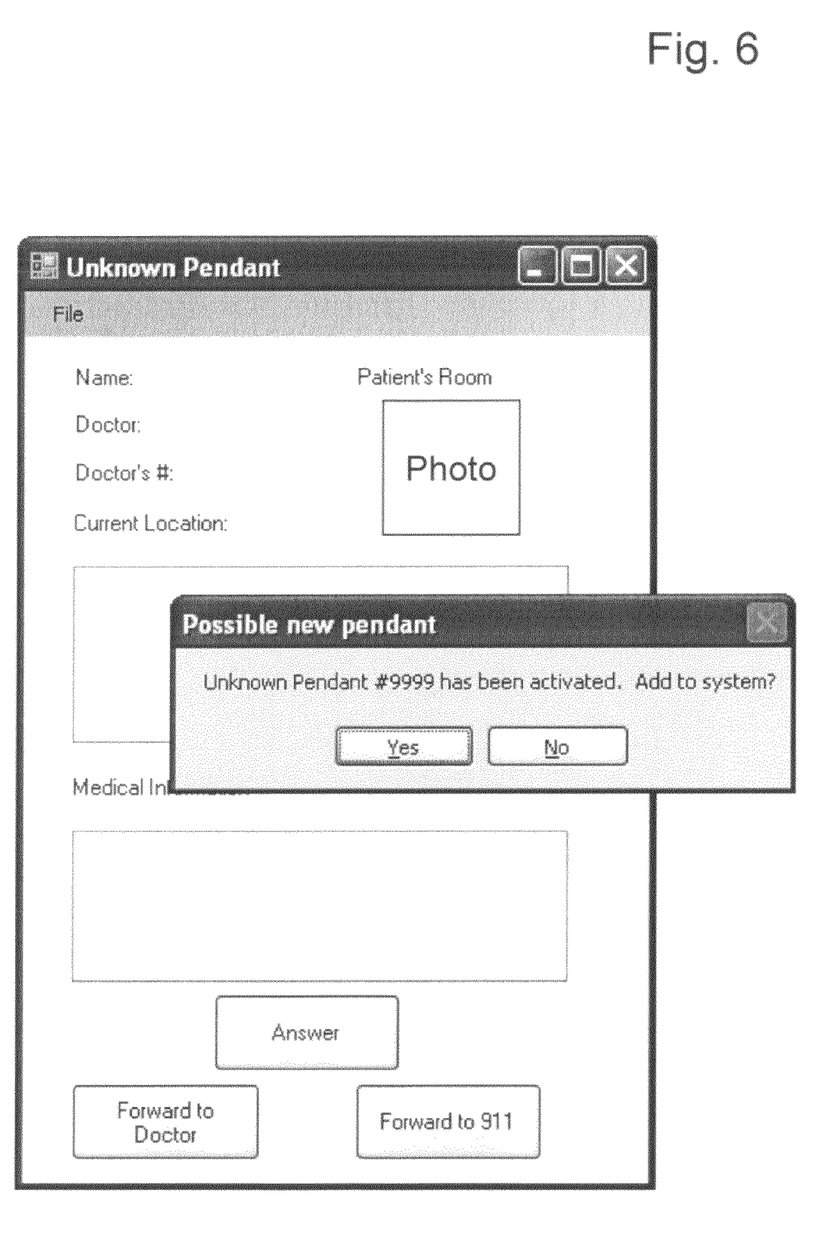
FIG. 6 is a screenshot of an exemplary computer interface for adding new pendants to a monitoring station.

In one embodiment of the present invention, new pendants can be added to the monitoring station (e.g., by manually entering a pendant ID or by activating a pendant and adding the appropriate information to the database through a user interface or a file). As shown in FIG. 6, the activation of a pendant whose pendant ID is not contained in the system will prompt the caretaker (or administrator) as to whether the ID should be added to the system.

Figure 7:
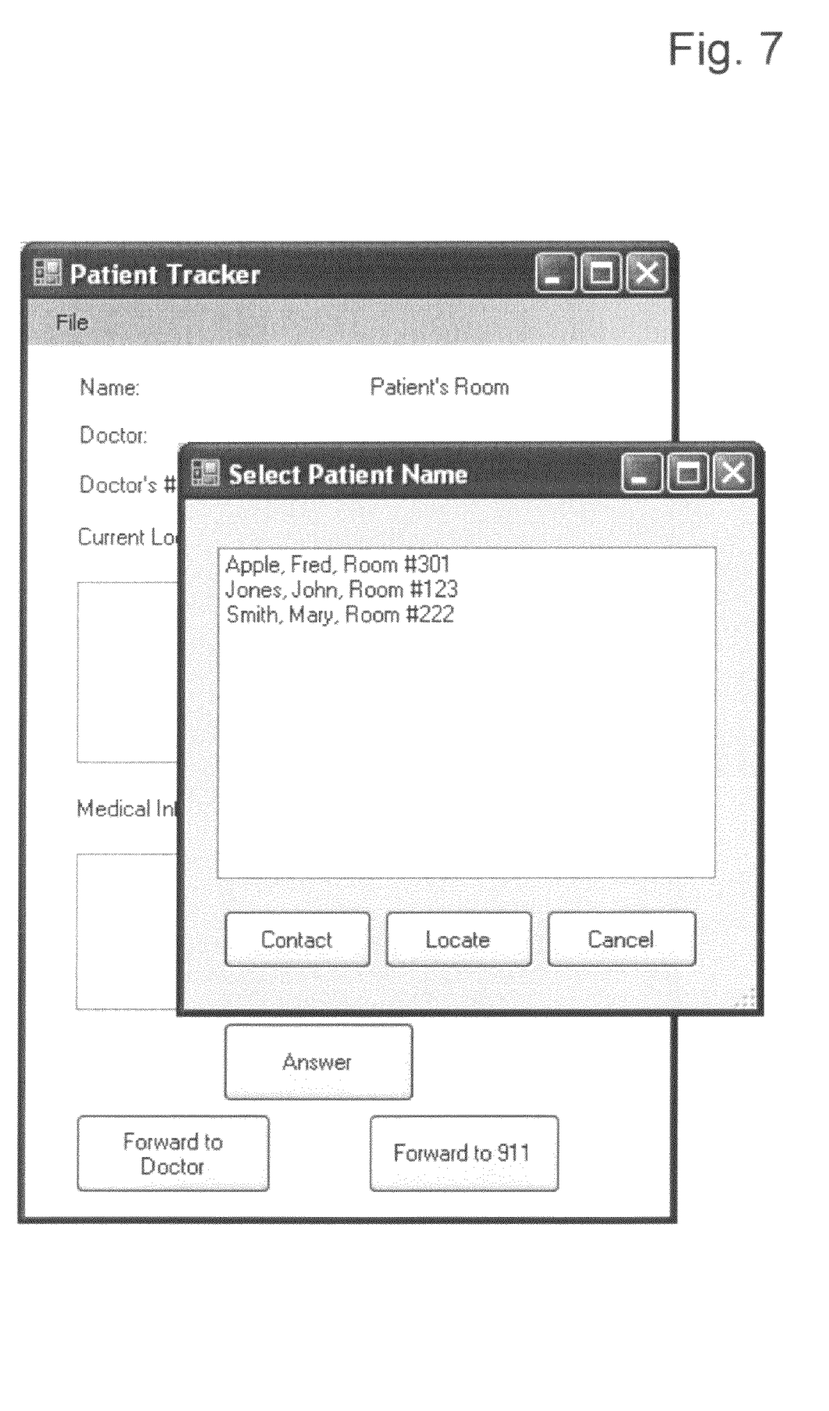
FIG. 7 is a screenshot of an exemplary computer interface for requesting an out-bound connection to a pendant from a monitoring station.

The remote monitoring system may also utilize the voice features of the pendant as a paging system for reaching the patient. For example, by using a computer interface (e.g., as shown in FIG. 7) at the remote monitoring station, a particular patient may be identified from a list of patients and then the patient can be contacted or located, if possible, through his or her pendant. Such a paging mechanism can be helpful, for example, if the patient needs to be called inside to take his or her medicine but he or she is not located close to a location sensor (e.g., if he or she is outdoors).

The connection of the remote monitoring station to an identified patient/resident can further be part of a multi-party call. For example, a pendant worn by a first caretaker or staff member may be activated such that the first caretaker is placed into voice contact with a second caretaker at the remote monitoring station. The first caretaker may then request that the second caretaker use the remote monitoring station to bridge a call to an identified patient at a next available opportunity. This creates a pendant-to-pendant communication.

Alternatively, instead of contacting a second caretaker at the remote monitoring station, the first caretaker may instead be connected to a voice prompt system such that, e.g., using voice recognition or DTMF tone detection, the first caretaker can specify a pendant or person to contact without needing human intervention. In yet another embodiment, the caretaker pendant may include a more sophisticated user interface (e.g., a numeric keypad, an alphanumeric keypad or a touchscreen) or may instead be a personal digital assistant (PDA) that communicates over the same wireless network as the resident/patient's pendant.

In addition to the remote monitoring station being able to track the locations of the pendants, individual pendants may also be tracked from outside the facility (e.g., by a family member) using an information service (e.g., the World Wide Web). In such a case, when a family member doesn't reach the resident/patient at his/her room, the family member can ease his/her mind by finding out where on the grounds the resident/patient is. Such a service may require permission by the resident/patient and authentication by the family member (e.g., by using a password) in order to receive the stored (or real-time) location information.

There are other known wireless techniques (typically in the 300 MHz range) allowing a device to very quickly "wake up" and see if it is being paged. A typical product on the market today that uses this technique is a wireless battery powered doorbell receivers in a home application. The receiver is a very inexpensive radio receiver which is battery powered. Yet, it has the ability to wake-up and check for a paging signal matching its ID—all in about ⅟₅₀th of a second. And the receiver system draws very little power—allowing a small alkaline battery to last up to a year.

Accordingly, in an alternate embodiment, the pendant 120 includes two RF circuits. A first transceiver RF circuit would communicate with the wireless network (e.g., via a WiFi protocol). The second circuit would be a dedicated receive only—low battery drain—low parts circuitry receiver that would perform this wake-up and check if its being paged feature. Having this circuitry check every second or two (as a battery powered wireless doorbell does)-would give the pendant and network system the appearance of a pendant that is "always on". Yet—not drawing any current from the main communication RF circuitry until an actual two-way voice communication is needed.

While certain configurations of structures have been illustrated for the purposes of presenting the basic structures of the present invention, one of ordinary skill in the art will appreciate that other variations are possible which would still fall within the scope of the appended claims.

The invention claimed is:

1. A wireless network-based emergency response system, comprising:
 a wireless network-based pendant to be carried by a member of the wireless network-based emergency response system, the wireless pendant including memory for storing an identifier identifying the pendant, a microphone, an actuator for indicating that the member is in need of emergency services, and a first wireless network-based transceiver;
 a wireless network-based receiver receiving from the pendant, using a wireless network protocol, (1) a first signal indicative of the identifier stored in the pendant, (2) a second signal indicating that the actuator has been activated and the member is in need of the emergency services and (3) third voice signals representing sounds captured from the microphone of the pendant; and
 a remote monitoring station connected to the receiver, without the use of a circuit switched telephone network, receiving fourth, fifth and sixth signals corresponding to the first, second and third signals, identifying, to emergency services personnel, information about the member associated with the pendant based on the fourth and fifth signals, and for communicating to the emergency services personnel voice signals indicative of the sounds captured from the microphone of the pendant based on the sixth signals;
 the remote monitoring system having a user interface providing an operator of the remote monitoring system with a first automated option of forwarding the voice signals indicative of the sounds captured from the microphone of the pendant based on the sixth signals to a physician previously associated with the member and a second automated option of forwarding the voice signals indicative of the sounds captured from the microphone of the pendant based on the sixth signals to 911 emergency services.

2. The system as claimed in claim 1, wherein the wireless network comprises at least one of a WiFi-based network, a 802.11-based network, a WiMax-based network and a mesh-based network.

3. The system as claimed in claim 2, wherein the mesh-based network comprises a ZigBee-based network.

4. The system as claimed in claim 1, wherein the information comprises medical information about the member.

5. The system as claimed in claim 4, wherein the medical information comprises information about drugs being taken by the member.

6. The system as claimed in claim 4, wherein the medical information comprises information about a doctor responsible for the member.

7. The system as claimed in claim 1, wherein the wireless network-based receiver is integrated into the remote monitoring station.

8. The system as claimed in claim 1, wherein the wireless network-based receiver is connected to the remote monitoring station via a wireless network.

9. The system as claimed in claim 1, wherein the wireless network-based receiver is connected to the remote monitoring station via a wired network.

10. The system as claimed in claim 9, wherein the wired network comprises an Ethernet network.

11. The system as claimed in claim 1, wherein the wireless network-based receiver comprises a second wireless transceiver for converting the first, second and third signals conforming to a first protocol into the fourth, fifth and sixth signals conforming to a second protocol, and wherein the remote monitoring system is connected to the second wireless transceiver for receiving the fourth, fifth and sixth signals from the second wireless transceiver.

12. The system as claimed in claim 1, wherein the wireless network-based receiver comprises a router and a second wireless transceiver, the second wireless transceiver for converting the first, second and third signals conforming to a first protocol into signals conforming to a second protocol, wherein the second wireless transceiver transmits the signals conforming to the second protocol to the router, and wherein the remote monitoring system is connected to the router for receiving the fourth, fifth and sixth signals from the router based on the signals conforming to the second protocol.

13. The system as claimed in claim 1, wherein the wireless network-based pendant further comprises a speaker.

14. A method of communicating comprising:

transmitting, from a wireless network-based pendant being carried by a member of a wireless network-based emergency response system, (1) a first identification signal identifying the pendant, (2) a second actuation signal indicating that the member is in need of emergency services and has pressed an actuator on the pendant, and (3) third signals representing sounds captured by a microphone of the pendant;

receiving from the pendant at a wireless network-based receiver the first, second and third signals;

transmitting signals indicative of a portion of the first, second and third signals from the receiver to a remote monitoring station connected to the receiver;

receiving the signals indicative of a portion of the first, second and third signals at the remote monitoring station;

providing to an operator of the remote monitoring system a user interface, the user interface including a first automated option performing steps of:
- (1) identifying to a physician previously associated with the member information about the member associated with the pendant based on signals indicative of a portion of the first and second signals; and
- (2) communicating to the physician previously associated with the member voice signals indicative of the sounds captured from the microphone of the pendant based on signals indicative of a portion of the third signals; and providing to the operator of the remote monitoring system the user interface including a second automated option performing the steps of:
- (1) identifying to 911 emergency services information about the member associated with the pendant based on signals indicative of a portion of the first and second signals; and
- (2) communicating to the 911 emergency services voice signals indicative of the sounds captured from the microphone of the pendant based on signals indicative of a portion of the third signals.

* * * * *